(12) United States Patent
Kofler

(10) Patent No.: US 11,210,967 B2
(45) Date of Patent: Dec. 28, 2021

(54) CENTRAL EXECUTIVE TRAINING PLATFORM

(71) Applicant: FLORIDA STATE UNIVERSITY RESEARCH FOUNDATION, INC., Tallahassee, FL (US)

(72) Inventor: Michael J. Kofler, Tallahassee, FL (US)

(73) Assignee: Florida State University Research Foundation, INC., Tallahassee, FL (US)

( * ) Notice: Subject to any disclaimer, the term of this patent is extended or adjusted under 35 U.S.C. 154(b) by 708 days.

(21) Appl. No.: 15/938,018

(22) Filed: Mar. 28, 2018

(65) Prior Publication Data

US 2018/0286273 A1    Oct. 4, 2018

Related U.S. Application Data

(60) Provisional application No. 62/478,892, filed on Mar. 30, 2017.

(51) Int. Cl.
| | |
|---|---|
| *G09B 19/00* | (2006.01) |
| *G09B 5/06* | (2006.01) |
| *A63F 13/67* | (2014.01) |
| *A63F 13/80* | (2014.01) |

(52) U.S. Cl.
CPC ............ *G09B 19/00* (2013.01); *G09B 5/06* (2013.01); *A63F 13/67* (2014.09); *A63F 13/80* (2014.09)

(58) Field of Classification Search
CPC ... A61B 5/4058; A61B 5/4806; A61B 5/4821; G09B 19/00; G09B 5/06; A63F 13/67; A63F 13/80
See application file for complete search history.

(56) References Cited

U.S. PATENT DOCUMENTS

| | | | |
|---|---|---|---|
| 7,878,810 B2* | 2/2011 | Kuntz | G09B 7/00 434/236 |
| 9,308,445 B1* | 4/2016 | Merzenich | A63F 13/67 |

\* cited by examiner

*Primary Examiner* — Robert J Utama
(74) *Attorney, Agent, or Firm* — Eversheds Sutherland (US) LLP

(57) ABSTRACT

Various embodiments are directed to a central executive training (CET) platform that targets central executive processes, rather than short term memory. Central executive deficits have been linked experimentally and developmentally with Attention Deficit Hyperactivity Disorder (ADHD) symptoms and impairments. Unfortunately, substantial evidence indicates that conventional working memory training programs fail to improve these symptoms and impairments. This discrepancy may reflect insufficient targeting, as extant protocols focus on short term memory and do not adequately engage the specific central executive components linked with the disorder's behavioral and functional impairments.

17 Claims, 10 Drawing Sheets

| Stimuli Modality | Central Executive Process | | |
|---|---|---|---|
| | Continuous Updating 708 | Dual-Processing (Complex Span) 710 | Temporal/Serial Reordering 712 |
| Verbal (Phonological) 702 | Verbal Updating "Word Wheel" | Verbal Dual-Processing "The Hideout" | Verbal Reordering "Decoder" |
| Visual 704 | Visual Updating "Shape Shooter" | Visual Dual-Processing "Short Circuit" | Visual Reordering "Sweet Sampler" |
| Spatial 706 | Spatial Updating "First Encounter" | Spatial Dual-Processing "Scout Trainer" | Spatial Reordering "Master Thief" |

FIG. 7

CENTRAL EXECUTIVE TRAINING PLATFORM

STATEMENT REGARDING FEDERALLY SPONSORED RESEARCH OR DEVELOPMENT

This invention was made with government support under grant number R34 MH102499 awarded by the National Institutes of Health (NIH). The government has certain rights in the invention.

TECHNICAL FIELD

The present disclosure generally relates to therapies for individuals with central executive (CE) deficits, such as those with attention deficit hyperactivity disorder (ADHD) or Specific Learning Disabilities.

BACKGROUND

Attention Deficit Hyperactivity Disorder (ADHD) is a serious public health concern. ADHD is a complex, chronic, and potentially debilitating disorder of brain, behavior, and development that affects five percent (5%) of school-aged children at an annual U.S. cost of illness of over $42 billion. Longitudinal studies reveal that functionally impairing ADHD symptoms continue into adolescence and adulthood for most individuals, and are associated with scholastic underachievement and increased high school/college dropout rates, impaired social functioning, lower socioeconomic status, and less secure employment.

While much effort has gone into identifying patterns of development, risk factors, and benefits of behavioral and pharmacological treatments, the current status is that even the best interventions do not "normalize" behavior for these children (e.g., move them from clinical to nonclinical status). Moreover, these interventions show minimal impact on functional indicators such as academic outcomes and executive functioning. Evaluation of effects on central executive deficits, a key area of impairment for 81% to 93% of these children, also shows limited, if any, effects for these interventions. This is critical given clinical and developmental evidence implicating central executive deficits in many of the primary behavioral and functional impairments in ADHD.

BRIEF DESCRIPTION OF THE DRAWINGS

The detailed description is set forth with reference to the accompanying drawings. The use of the same reference numerals indicates similar or identical components or elements; however, different reference numerals may be used as well to indicate components or elements which may be similar or identical. Various embodiments of the disclosure may utilize elements and/or components other than those illustrated in the drawings, and some elements and/or components may not be present in various embodiments. Depending on the context, singular terminology used to describe an element or a component may encompass a plural number of such elements or components and vice versa.

FIG. 7 is a diagram of an illustrative CET platform protocol in accordance with one or more embodiments of the disclosure.

DETAILED DESCRIPTION

Figure 1:
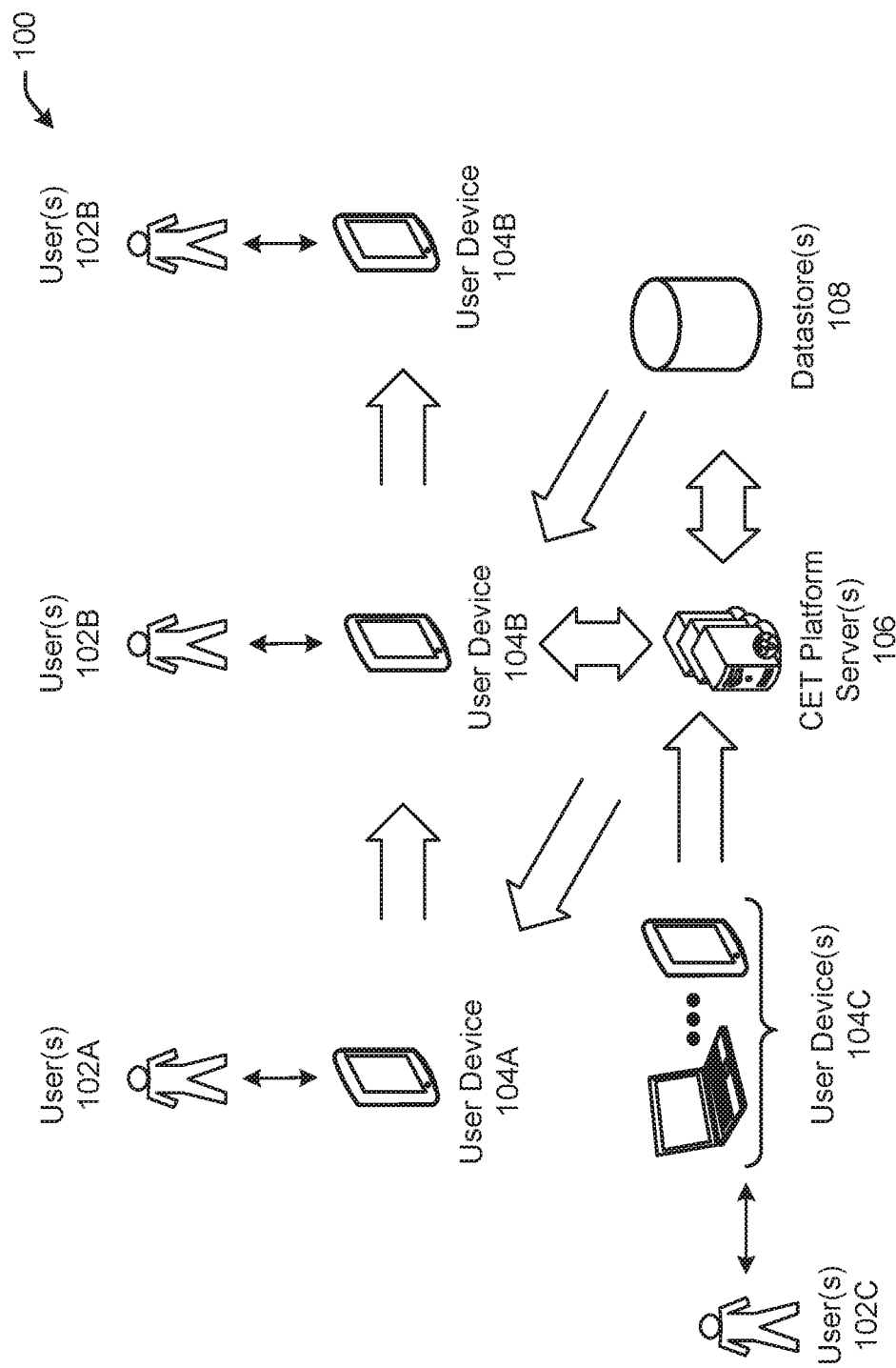
FIG. 1 depicts an illustrative data flow between various components of an illustrative system architecture for a central executive training platform in accordance with one or more embodiments of the disclosure.

This disclosure relates to, among other things, systems, methods, computer-readable media, techniques, and methodology for a central executive training (CET) platform. The systems and methods described herein use integrative neurocognitive research to systematically evaluate the specific central executive components that are impaired in ADHD, and experimentally link these impairments with objectively-measured core behavioral symptoms (e.g., inattention, hyperactivity, impulsivity, etc.), academic underachievement, inhibitory control, performance variability, and peer and family functioning.

Current evidence-based treatments are available to help alleviate ADHD symptoms. Psychostimulant medication is associated with acute reductions in ADHD symptoms. Behavioral interventions (e.g., caregiver training) portend more moderate benefits over the same time frame, and may not provide incremental benefits when added to medication. These reductions in behavioral symptoms, however, are unaccompanied by significant or sustained improvements in academic and learning outcomes or executive functioning.

The limited efficacy and areas of functioning affected by current treatments warrants consideration if the field is to progress in designing innovative therapies for children with ADHD. Psychostimulants promote dopamine and norepinephrine availability in cortical-subcortical pathways involving the frontal/pre-frontal cortex, temporal lobe, and basal ganglia. These anatomical structures play a critical role in supporting executive functions (EF), an umbrella term for higher-order cognitive processes that enable goal directed behavior and novel problem solving. EF deficits are implicated in most contemporary models of ADHD, and associated with adverse educational, interpersonal, and occupational outcomes. Although stimulant treatment usually results in significant improvement on laboratory tasks such as the continuous performance test, its association with improved EF performance is considerably more limited. For example, placebo-controlled psychostimulant studies generally report improvement on several aspects of non-executive cognitive functioning involving regulation of attention and response speed, but small magnitude changes or no effects on tasks with a prominent executive component.

These results suggest that actuating the anatomical structures underlying EFs improves important aspects of task related attentional and motor response elements, but does not translate into meaningful improvement in EFs or associated learning outcomes. Improving executive functioning in ADHD reflects a critical next step in improving outcomes for these children, given EF's association with core ADHD symptoms and functional impairments.

When reviewed programmatically, current evidence-based therapies provide short-term relief of externalizing symptoms but minimally affect the EF deficits and adverse learning outcomes common to ADHD. There is a need for innovative interventions that affect core, EF deficits in ADHD, particularly those EFs identified in neurodevelopmental studies as not only impaired in ADHD but also linked to their behavioral and functional impairments. Converging empirical and theoretical evidence point to a particular EF, working memory, and a particular subcomponent of working memory, the central executive, as a promising intervention target. The central executive itself can be further subdivided into components commonly referred to as "continuous updating," "dual-processing," "serial/temporal re-ordering," and "interference control." Such targeting of the central executive or its subcomponents may yield an efficient method of improving effect generalization to symptoms and functioning and may promote sustained maintenance of effects, to the extent that this empirically-identified target is central to ADHD as suggested.

The CET platform translates clinical neurocognitive findings into a novel clinical protocol that affects ADHD behavioral symptoms by targeting central processes. According to the clinical model of psychopathology, interventions aimed at improving core psychological/cognitive features should produce the greatest breadth of therapeutic change. Those aimed at peripheral behaviors, in contrast, should show limited generalization upward to core features, and minimally affect other peripheral symptoms. Thus, there is a strong theoretical basis for CET platform's targeting of central executive (CE) processes to reduce ADHD behavioral symptoms.

CET platform involves facilitative training. This approach is designed to foster EF development rather than compensate for deficits. A central tenet is that lasting, quantitative improvement in the development and/or efficiency of EF-related neural substrates can be accomplished by extensive training involving repetition, practice, and feedback; and by doing so, improvement will transfer to other activities and abilities that rely on these same neural networks. Initial neuroimaging evidence supports this critical assumption of EF cognitive training programs, which differ from strategies that teach regulatory and problem-solving strategies.

Extant working memory training programs. Existing 'working memory' training protocols are ineffective for targeting central executive and ADHD behavioral symptoms, beyond expectancy/placebo effects attributable to unblinded parent reports in under controlled studies and/or misinterpretation of interactions as supporting efficacy (despite nonsignificant improvements in the treated group). In particular, the cognitive training content and treatment targets merit careful scrutiny for specificity of focus and which processes are actually affected. A recent meta-analysis of ADHD cognitive training studies indicated that the training tasks included in extant ADHD "working memory" training protocols primarily target short term memory (STM) capacity, with incidental or non-existent CE training. For example, the primary adaptive component of these interventions involves increasing the number of items to be remembered. This has face validity for increasing CE demands; however, developmental and clinical evidence indicates that CE demands remain relatively unchanged when merely increasing stimuli quantity.

Training STM rather than CE is problematic for at least two reasons, and is a leading candidate to explain the lack of training-related improvements in objective/blinded ADHD symptoms and academic achievement. First, STM capacities are the least impaired working memory components in ADHD. In contrast, CE deficit magnitude is the highest of any identified impairment in children with ADHD. These effect sizes indicate that over 98% of ADHD children perform below the Non-ADHD mean on central executive tests, and 81%-93% of ADHD children score outside the Non-ADHD range on measures of CE functioning. Second, STM deficits are minimally involved in ADHD symptoms, whereas underdeveloped CE abilities in children with ADHD are related functionally to inattentive, hyperactive, and impulsive behavior, and predict ADHD-related academic underachievement, social problems, and parent-child relational difficulties. According, it is unlikely that extant interventions improve objective/blinded ADHD symptoms or important areas of functioning.

In ADHD samples, STM training portends improvements in the storage/rehearsal (STM) components of working memory, suggesting malleability of targeted working memory components for ADHD children. Prior to this work, no ADHD study had trained CE processes; in non-ADHD samples, however, recent evidence provides converging evidence that the CE processes targeted in the current proposal can benefit from training, and that training these CE processes may result in improvements in hyperactivity and inattention symptoms. Preliminary fMRI evidence suggests also that this cognitive training results in functional changes in expected cortical regions. Collectively, these data suggest that (a) children with ADHD can benefit from cognitive training, (b) CE can be improved through training as measured by both performance and cortical activation, and (c) CE processes are significantly underdeveloped in those with ADHD and CE processes are associated with many of their behavioral and functional difficulties.

The CET platform was developed by incorporating empirical findings and theoretical formulations linking neurodevelopmental processes to ADHD symptoms through central processes, particularly executive functions (EFs). There is sufficient preliminary evidence that CET platform shows promise for targeting executive skills and thereby reducing ADHD symptoms and improving functioning.

CET platform links a specific component of neurocognition, the central executive (CE), to a critical role in ADHD and testing a novel treatment approach to affect that component (CE functioning). The substantial literature validating large CE deficits in individuals with ADHD, coupled with their unique prediction of myriad behavioral and functional outcomes, renders this particular EF a highly credible target for innovative treatments. Unfortunately, current 'working memory' trainings are intricately tied to training STM, with only incidental CE training. Thus, a fundamentally different approach was developed to translate these findings into an evidence-informed training paradigm. Extant working memory interventions are based on an inadequate and inaccurate model of the core deficits in ADHD. To date, these interventions have limited empirical support and target inappropriate aspects of the syndrome. Although in widespread use, there is no indication that they are efficacious; using them may delay individuals from receiving appropriate interventions and increase the likelihood of adverse outcomes. The CET platform is an empirically informed CE training tool for adolescents, adults, and young children with CE deficits, such as the many individuals with ADHD. The mounting evidence suggests that successfully treating underlying CE impairments should have clear effects on ADHD behavioral/functional impairments. Evidence suggests that most ADHD symptoms could be eliminated if CE processes were normalized—in other words, improving CE abilities should significantly reduce ADHD symptom quantity and severity.

Beyond ADHD treatment, recent research suggests that successfully treating underlying CE impairments could also help individuals with Specific Learning Disabilities, as the CE processes targeted by the CET platform (i.e., continuous updating, dual-processing, serial/temporal re-ordering, and interference control) have been linked to skills in reading, mathematics, and listening comprehension. Accordingly, the CET platform described herein can be used to help individuals having a wide range of impairments or disabilities, such as ADHD, Specific Learning Disabilities, or any other impairment or disability which may be improved by addressing CE deficits.

Various illustrative embodiments have been discussed above. These and other example embodiments of the disclosure will be described in more detail hereinafter through reference to the accompanying drawings. The drawings and the corresponding description are provided merely for illustration and are not intended to limit the disclosure in any way. It should be appreciated that numerous other embodiments, variations, and so forth are within the scope of this disclosure.

Illustrative Use Cases and System Architecture

FIG. 1 depicts an illustrative data flow between various components of an illustrative system architecture 100 for a CET platform in accordance with one or more embodiments of the disclosure. One or more illustrative user device(s) 104A, 104B, 104C (collectively 104) operable by one or more user(s) 102A, 102B, 102C (collectively 102) are illustratively depicted in FIG. 1. The user device(s) 104 may include any suitable processor-driven computing device including, but not limited to, a desktop computing device, a laptop computing device, a server, a smartphone, a tablet, and so forth. For ease of explanation, the user device(s) 104 may be described herein in the singular; however, it should be appreciated that multiple user device(s) 104 may be provided.

The user device 104A may receive input from a user 102A (e.g., an administrator). In some embodiments, the administrator 102A may specify one or more specific CET platform trainings for a second user (e.g., patient). The second user 102B may operate a different user device 104B to connect to the CET platform to interact with the system and provide user input in response to presentation of one or more CET platform trainings. The user device 104B may communicate with one or more CET platform server(s) 106 to be authenticated and connected to the CET platform. The CET platform server(s) 106 may authenticate the patient 102B based at least in part on control policies specified by the administrator 102A. The user device 104B operated by the patient 102B may also communicate with one or more datastore(s) 108 to obtain specific CET platform trainings. In some embodiments, such as in the case of the patient being a child, a third user (e.g., caregiver 102C, therapists, or the like) may access data associated with the second user 102B via their respective user devices 104C. In some embodiments, the caregiver 102C may provide user input indicating observations or other data associated with the patient 102B. The user device 104B operated by the patient 102B may obtain CET platform trainings from different sources (e.g., CET platform server 106, datastore 108, other user devices 104C, and the like) and may present the content to the patient 102B in a single user interface, permitting the patient 102B to view and interact with the different trainings using a single interface. The CET platform server 106 may obtain user input from the administrator 102A, patient 102B, and/or the caregiver 102C and may analyze the data to determine the effect of the CET platform training on the ADHD symptoms of the patient 102B and may facilitate (e.g., generate and/or send) presentation of the data to the administrator 102A and/or the caregiver 102C for viewing.

Figure 2:
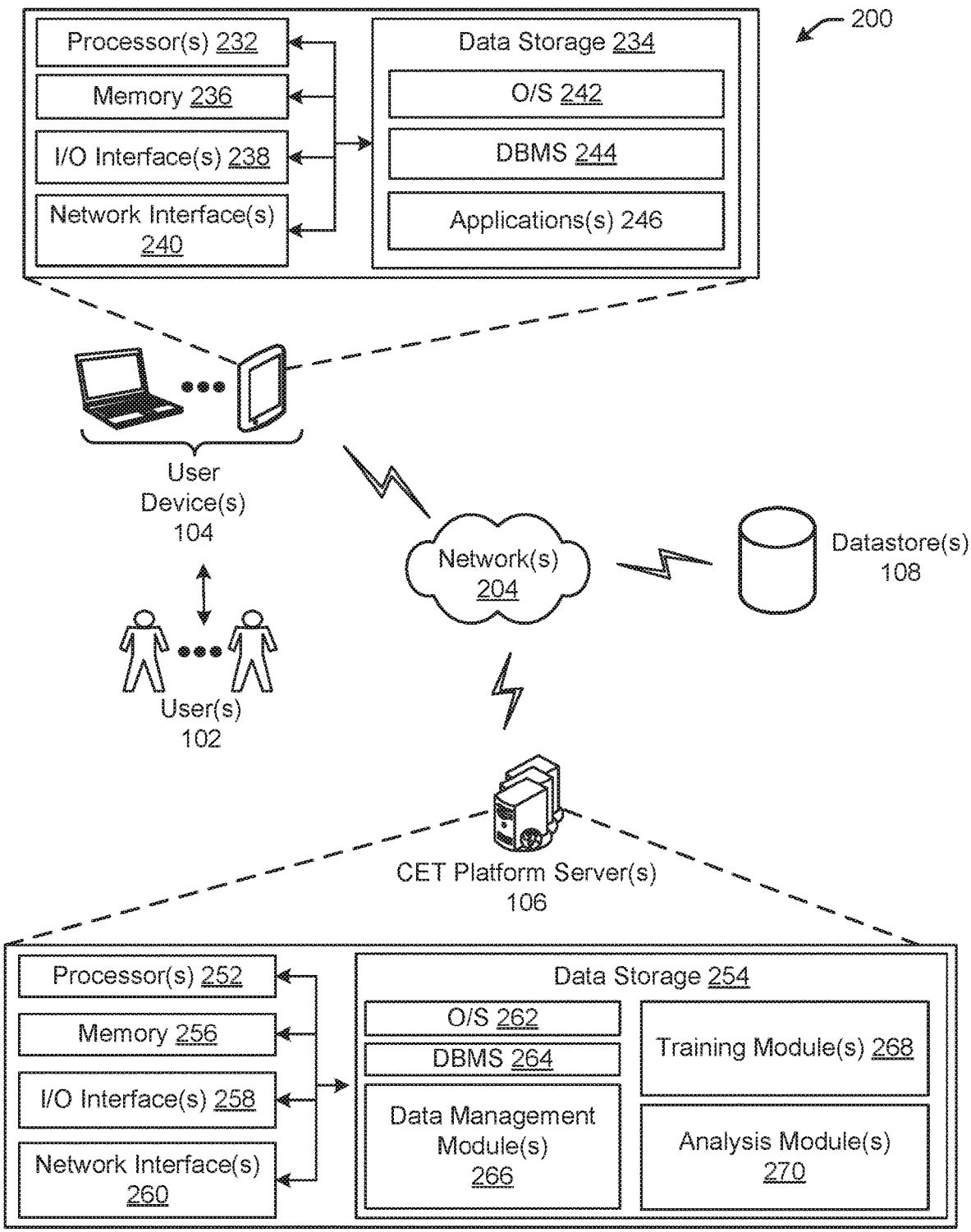
FIG. 2 is a block diagram including various hardware and software components of the illustrative system architecture depicted in FIG. 1 in accordance with one or more embodiments of the disclosure.

FIG. 2 is a block diagram including various hardware and software components of the illustrative system architecture depicted in FIG. 1 in accordance with one or more embodiments of the disclosure. The illustrative system architecture 200 may include one or more user devices 104 operable by one or more user(s) 102, one or more CET platform server(s) 106, and/or one or more datastore(s) 108. The user device(s) 104 may include any of the types of devices described through reference to FIG. 1. The CET platform server(s) 106 may include any of the types of devices described through reference to FIG. 1. The datastore(s) 108 may include any of the types of devices described through reference to FIG. 1.

Any of the user device(s) 104, CET platform server(s) 106, and/or datastore(s) 108 may be configured to communicate with each other and any other component of the system architecture 200 via one or more network(s) 204. The network(s) 204 may include, but are not limited to, any one or a combination of different types of suitable communications networks such as, for example, cable networks, public networks (e.g., the Internet), private networks, wireless networks, cellular networks, or any other suitable private and/or public networks. Further, the network(s) 204 may have any suitable communication range associated therewith and may include, for example, global networks (e.g., the Internet), metropolitan area networks (MANs), wide area networks (WANs), local area networks (LANs), or personal area networks (PANs). In addition, the network(s) 204 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, satellite communication mediums, or any combination thereof.

The user device(s) 104 may include one or more processors (processor(s)) 232 and one or more memories 236 (referred to herein generically as memory 236). The processor(s) 232 may include any suitable processing unit capable of accepting digital data as input, processing the input data based on stored computer-executable instructions, and generating output data. The computer-executable instructions may be stored, for example, in a non-transitory computer-readable medium (e.g., the data storage 234) and may include, among other things, operating system software and application software. The computer-executable instructions may be retrieved from the data storage 234 and loaded into the memory 236 as needed for execution. The processor(s) 232 may be configured to execute the computer-executable instructions to cause various operations to be performed. The processor(s) 232 may include any type of processing unit including, but not limited to, a central processing unit, a microprocessor, a microcontroller, a Reduced Instruction Set Computer (RISC) microprocessor, a Complex Instruction Set Computer (CISC) microprocessor, an Application Specific Integrated Circuit (ASIC), a System-on-a-Chip (SoC), a field-programmable gate array (FPGA), and so forth.

The data storage 234 may store program instructions that are loadable and executable by the processor(s) 232, as well as data manipulated and generated by the processor(s) 232 during execution of the program instructions. The program instructions may be loaded into the memory 236 as needed for execution. Depending on the configuration and implementation of the user device(s) 104, the memory 236 may be volatile memory (memory that is not configured to retain stored information when not supplied with power) such as random access memory (RAM) and/or non-volatile memory (memory that is configured to retain stored information even when not supplied with power) such as read-only memory (ROM), flash memory, and so forth. In various implementations, the memory 236 may include multiple different types of memory, such as various forms of static random access memory (SRAM), various forms of dynamic random access memory (DRAM), unalterable ROM, and/or writeable variants of ROM such as electrically erasable programmable read-only memory (EEPROM), flash memory, and so forth.

The user device(s) 104 may further include additional data storage 234 such as removable storage and/or non-removable storage including, but not limited to, magnetic storage, optical disk storage, and/or tape storage. Data storage 234 may provide non-volatile storage of computer-executable instructions and other data. The memory 236 and/or the data storage 234, removable and/or non-removable, are examples of computer-readable storage media (CRSM).

The user device(s) 104 may further include network interface(s) 240 that facilitate communication between the user device(s) 104 and other devices of the illustrative system architecture 200 (e.g., CET platform server(s) 106, datastore(s) 108, etc.) or application software via the network(s) 204. The user device(s) 104 may additionally include one or more input/output (I/O) interfaces 238 (and optionally associated software components such as device drivers) that may support interaction between a user 102 and a variety of I/O devices, such as a keyboard, a mouse, a pen, a pointing device, a voice input device, a touch input device, a display, speakers, a camera, a microphone, a printer, and so forth.

Referring again to the data storage 234, various program modules, applications, or the like may be stored therein that may comprise computer-executable instructions that when executed by the processor(s) 232 cause various operations to be performed. The memory 236 may have loaded from the data storage 234 one or more operating systems (O/S) 242 that may provide an interface between other application software (e.g., dedicated applications, a browser application, a web-based application, a distributed client-server application, etc.) executing on the user device 104 and the hardware resources of the user device 104. More specifically, the O/S 242 may include a set of computer-executable instructions for managing the hardware resources of the user device(s) 104 and for providing common services to other application programs (e.g., managing memory allocation among various application programs). The O/S 242 may include any operating system now known or which may be developed in the future including, but not limited to, any mobile operating system, desktop or laptop operating system, mainframe operating system, or any other proprietary or open-source operating system.

The data storage 234 may further include one or more database management systems (DBMS) 244 for accessing, retrieving, storing, and/or manipulating data stored in one or more datastores (e.g., datastore 108). The DBMS 244 may use any of a variety of database models (e.g., relational model, object model, etc.) and may support any of a variety of query languages.

The data storage 234 may additionally include various other program modules that may include computer-executable instructions for supporting a variety of associated functionality. For example, the data storage 234 may include one or more application(s) 246.

The applications(s) 246 may include computer-executable instructions that in response to execution by the processor(s) 232 cause operations to be performed including executing of different functionality specific to the application(s) 246. The application(s) 246 may transmit a request to the CET platform server 106 to access the CET platform (e.g., authentication and/or requesting access to one or more trainings). In some embodiments, the application(s) 246, may be a client application, such as a mobile application, that is specifically associated with the CET platform. In some embodiments, the application(s) 246 may be a web browser used to access and interact with the CET platform.

Within the data storage 234, one or more modules may be stored. As used herein, the term module may refer to a functional collection of instructions that may be executed by the one or more processor(s) 232. For ease of description, and not by way of limitation, separate modules are described. However, it is understood that in some implementations the various functions provided by the modules may be merged, separated, and so forth. Furthermore, the modules may intercommunicate or otherwise interact with one another, such that the conditions of one affect the operation of another.

The CET platform server(s) 106 may include one or more processors (processor(s)) 252 and one or more memories 256 (referred to herein generically as memory 256). The processor(s) 252 may include any suitable processing unit capable of accepting digital data as input, processing the input data based on stored computer-executable instructions, and generating output data. The computer-executable instructions may be stored, for example, in the data storage 254 and may include, among other things, operating system software and application software. The computer-executable instructions may be retrieved from the data storage 254 and loaded into the memory 256 as needed for execution. The processor(s) 252 may be configured to execute the computer-executable instructions to cause various operations to be performed. The processor(s) 252 may include any type of processing unit including, but not limited to, a central processing unit, a microprocessor, a microcontroller, a Reduced Instruction Set Computer (RISC) microprocessor, a Complex Instruction Set Computer (CISC) microprocessor, an Application Specific Integrated Circuit (ASIC), a System-on-a-Chip (SoC), a field-programmable gate array (FPGA), and so forth.

The data storage 254 may store program instructions that are loadable and executable by the processor(s) 252, as well as data manipulated and generated by the processor(s) 252 during execution of the program instructions. The program instructions may be loaded into the memory 256 as needed for execution. Depending on the configuration and implementation of the CET platform server(s) 106, the memory 256 may be volatile memory (memory that is not configured to retain stored information when not supplied with power) such as random access memory (RAM) and/or non-volatile memory (memory that is configured to retain stored information even when not supplied with power) such as read-only memory (ROM), flash memory, and so forth. In various implementations, the memory 256 may include multiple different types of memory, such as various forms of static random access memory (SRAM), various forms of dynamic random access memory (DRAM), unalterable ROM, and/or writeable variants of ROM such as electrically erasable programmable read-only memory (EEPROM), flash memory, and so forth.

The CET platform server(s) 106 may further include additional data storage 254 such as removable storage and/or non-removable storage including, but not limited to, magnetic storage, optical disk storage, and/or tape storage. Data storage 254 may provide non-volatile storage of computer-executable instructions and other data. The memory 256 and/or the data storage 254, removable and/or non-removable, are examples of computer-readable storage media (CRSM).

The CET platform server(s) 106 may further include network interface(s) 260 that facilitate communication between the CET platform server(s) 106 and other devices of the illustrative system architecture 200 (e.g., user device(s) 104, datastore(s) 108, etc.) or application software via the network(s) 204. The CET platform server(s) 106 may additionally include one or more input/output (I/O) interfaces 258 (and optionally associated software components such as device drivers) that may support interaction between a user 102 and a variety of I/O devices, such as a keyboard, a mouse, a pen, a pointing device, a voice input device, a touch input device, a display, speakers, a camera, a microphone, a printer, and so forth.

Referring again to the data storage 254, various program modules, applications, or the like may be stored therein that may comprise computer-executable instructions that when executed by the processor(s) 252 cause various operations to be performed. The memory 256 may have loaded from the data storage 254 one or more operating systems (O/S) 262 that may provide an interface between other application software (e.g., dedicated applications, a browser application, a web-based application, a distributed client-server application, etc.) executing on the CET platform server(s) 106 and the hardware resources of the CET platform server(s) 106. More specifically, the O/S 262 may include a set of computer-executable instructions for managing the hardware resources of the CET platform server(s) 106 and for providing common services to other application programs (e.g., managing memory allocation among various application programs). The O/S 262 may include any operating system now known or which may be developed in the future including, but not limited to, any mobile operating system, desktop or laptop operating system, mainframe operating system, or any other proprietary or open-source operating system.

The data storage 254 may further include one or more database management systems (DBMS) 264 for accessing, retrieving, storing, and/or manipulating data stored in one or more datastores (e.g., datastore 108). The DBMS 264 may use any of a variety of database models (e.g., relational model, object model, etc.) and may support any of a variety of query languages.

The data storage 254 may additionally include various other program modules that may include computer-executable instructions for supporting a variety of associated functionality. For example, the data storage 254 may include one or more data management module(s) 266, one or more training module(s) 268, and/or one or more analysis module(s) 270.

The data management module(s) 266 may include computer-executable instructions that in response to execution by the processor(s) 252 cause operations to be performed including authenticating a user 102 to interact with the CET platform server 106, receiving a request for one or more CET platform trainings, receiving requests for reports or summaries of analyzed data, or the like. The data management module(s) 266 may ensure that the received requests are sent to the appropriate module (e.g., training module(s) 268, analysis module(s) 270, etc.) and may generate responses to the requests for transmission to the respective user device 104.

The training module(s) 268 may include computer-executable instructions that in response to execution by the processor(s) 252 cause operations to be performed including presenting CET platform trainings (tasks) based on the request from the user 102B. In some embodiments, the CET platform trainings may include multiple rounds. Each round may include a pre-determined number of trials. The number of pre-determined trials can be based, at least in part, on the user 102B. For example, a new user may be presented with less trials than an experienced user, and the number of trails can be further increased or decreased based on the user input (e.g., a user completing tasks quickly and accurately can be given more trials per round). Each trial may be presented to the user 102B, requesting a specific user input (also referred to as a correct response or answer). The specific user input can include, for example, a combination or sequence of one or more user interactions with the user interface of the CET platform trainings. For example, the specific user input can include, but is not limited to, the touching of specific regions of the screen when using a touch screen or the pressing of a particular sequence of buttons when using a controller.

The training module 268 may receive user input (which may or may not include the specific user input) from the user device 104B of the user 104B as they interact with each trial. During each trial, or after completion of all the trials in the round, the training module 268 may evaluate or otherwise analyze the user input. This analysis can include, but is not limited to, a determination as to whether the user 104B has correctly provided the specific user input, a comparison of the specific user input to the input actually entered, a total number of correct inputs, a total number of incorrect inputs, a number of consecutive correct inputs, or a number of consecutive incorrect inputs. Based on this analysis, the training module 268 may compute one or more scores for the user 104B. For example, if the user 104B has correctly entered the specific user input with no errors, a score of 100 or 100% can be determined. If the user 104B has entered some, but not all, of the specific user input, then a score between 0 and 100 can be determined. The score can be further modified based on the number of incorrect responses. In some embodiments, all user inputs are weighted equally (e.g., if 40% of the user inputs are correct, a score of 40% can be generated). In other embodiments, some user inputs are weighed more heavily than others (e.g., if 40% of the user inputs are correct, a score of more than or less than 40% can be generated depending on the individual weightings of the correct inputs). Based on this analysis, the training module 268 may also adjust the difficulty level of the next round of tasks presented to the user 102B via the user device 104B. For example, if the user 104B has scored very highly the difficulty can be increased, while a very low score can result in the difficulty being lowered. In some embodiments, the training module 268 may receive additional user input (which may or may not include the specific user input) from the user device 104B of the user 104B as they interact with the next or later rounds. This additional user input can be similarly compared to the specific user input. Each CET platform training is developed to exercise a specific CET process, as discussed further in FIG. 7.

The learning management module(s) 270 may include computer-executable instructions that in response to execution by the processor(s) 252 cause operations to be performed including analyzing user input received from the user device 104B associated with the user 102B for each CET platform training completed as well as additional data provided by an administrator 102A of the system and/or caregiver 102C to measure any improvements or decline in ADHD symptoms. The learning management module 270 may also generate reports and track different information obtained in association with different patients 102B to analyze effects of the CET platform protocol across patients.

Within the data storage 254, one or more modules may be stored. As used herein, the term module may refer to a functional collection of instructions that may be executed by the one or more processor(s) 252. For ease of description, and not by way of limitation, separate modules are described. However, it is understood that in some implementations the various functions provided by the modules may be merged, separated, and so forth. Furthermore, the modules may intercommunicate or otherwise interact with one another, such that the conditions of one affect the operation of another.

Those of ordinary skill in the art will appreciate that any of the components of the system architecture 200 may include alternate and/or additional hardware, software, or firmware components beyond those described or depicted without departing from the scope of the disclosure. More particularly, it should be appreciated that hardware, software, or firmware components depicted or described as forming part of any of the illustrative components of the system architecture 200, and the associated functionality that such components support, are merely illustrative and that some components may not be present or additional components may be provided in various embodiments. While various program modules have been depicted and described with respect to various illustrative components of the system architecture 200, it should be appreciated that the functionality described as being supported by the program modules may be enabled by any combination of hardware, software, and/or firmware. It should further be appreciated that each of the above-mentioned modules may, in various embodiments, represent a logical partitioning of supported functionality. This logical partitioning is depicted for ease of explanation of the functionality and may not be representative of the structure of hardware, software, and/or firmware for implementing the functionality. Accordingly, it should be appreciated that the functionality described as being provided by a particular module may, in various embodiments, be provided at least in part by one or more other modules. Further, one or more depicted modules may not be present in certain embodiments, while in other embodiments, additional modules not depicted may be present and may support at least a portion of the described functionality and/or additional functionality. Further, while certain modules may be depicted and described as sub-modules of another module, in certain embodiments, such modules may be provided as independent modules.

Those of ordinary skill in the art will appreciate that the illustrative system architecture 200 is provided by way of example only. Numerous other operating environments, system architectures, and device configurations are within the scope of this disclosure. Other embodiments of the disclosure may include fewer or greater numbers of components and/or devices and may incorporate some or all of the functionality described with respect to the illustrative system architecture 200, or additional functionality.

Figure 3:
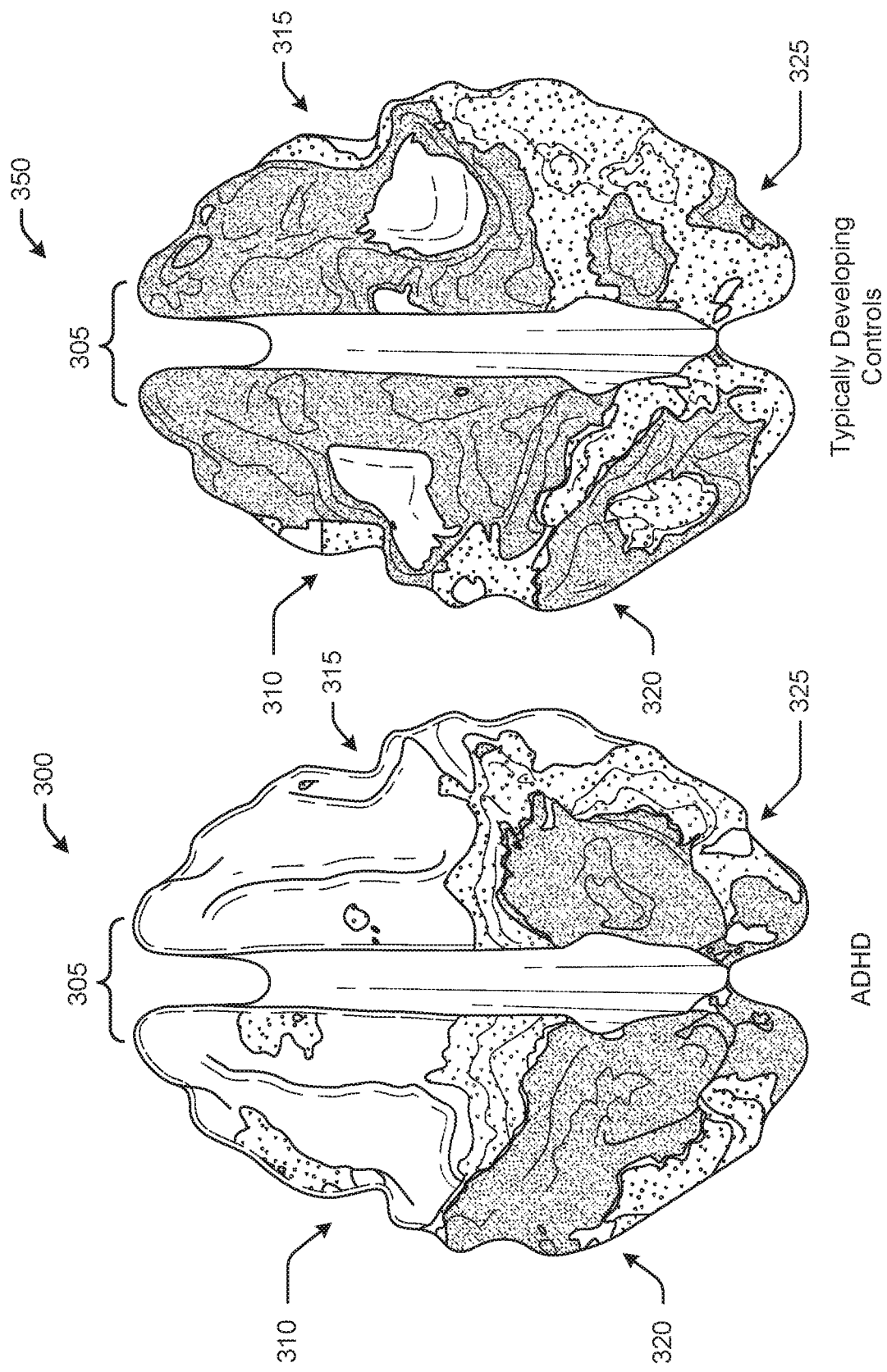
FIG. 3 is an illustrative diagram depicting cortical maturation in 8-year olds with and without ADHD.
Figure 4A:
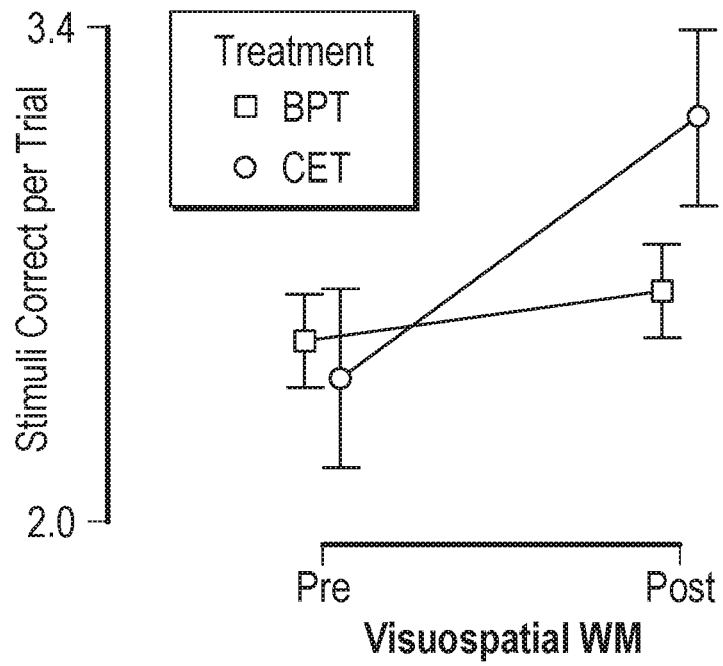
FIGS. 4A, 4B, 5A, 5B, 6A, and 6B are diagrams of comparative data analysis for the central executive training and a different ADHD protocol.
Figure 4B:
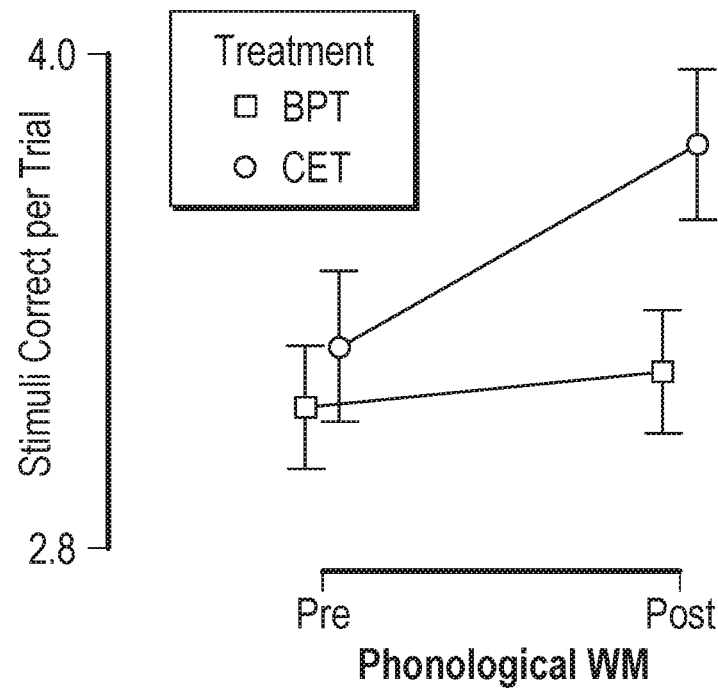
Figure 5A:
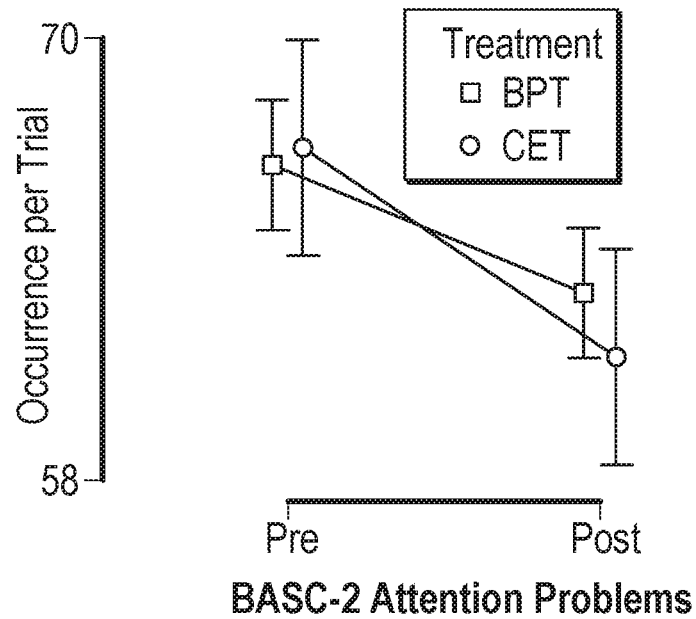
Figure 5B:
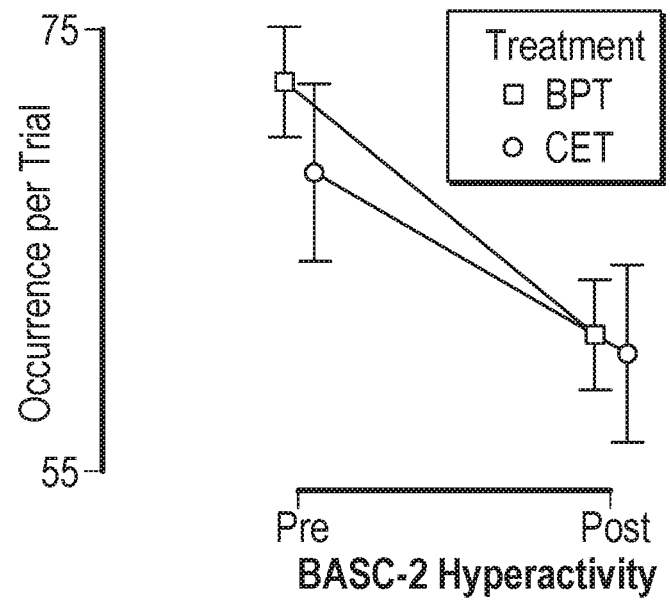
Figure 6A:
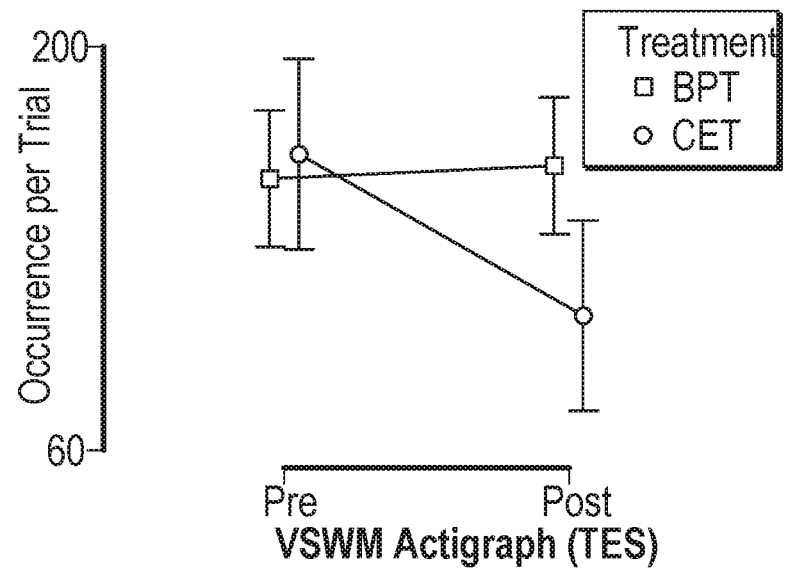
Figure 6B:
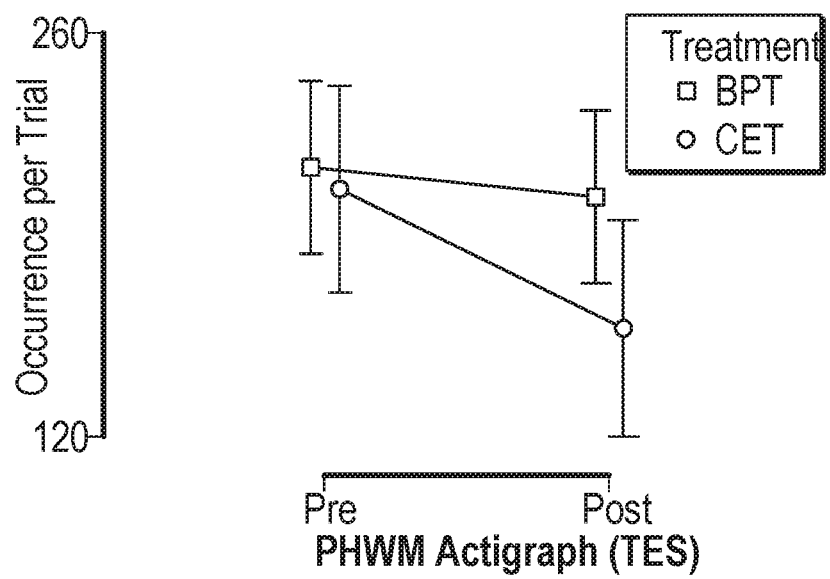

Now referring to FIG. 3, an illustrative diagram depicts an average cortical maturation of a brain of an 8-year old with ADHD 300 and cortical maturation of a brain of an 8-year old without ADHD 350. To inform CET targeting, a systematic and integrative meta-analysis of several ADHD cognitive training studies was conducted. It was determined that training the short-term memory (STM) components of working memory produced moderate magnitude improvements in those STM components. Accordingly, it was concluded that (1) extant "working memory" training studies actually primarily target STM, not the central executive processes, (2) there is limited theoretical/empirical rationale for targeting STM to affect ADHD—particularly for lasting, generalized, or broad effects, and (3) converging developmental and clinical evidence supports the potential of developing protocols specifically targeting central executive processes involving continuous updating, dual-processing, serial/temporal re-ordering, and interference control (not just STM).

The central executive is a promising candidate to ameliorate ADHD-related behavioral and functional impairments. Meta-analytic evidence reveals impairments in ADHD children's central executive that are more than twice the magnitude of any other identified cognitive impairment in the disorder, and experimental evidence indicates that central executive deficits play a key role in ADHD inattentive, hyperactive, and impulsive behavioral symptom expression. Deficiencies in central executive processes are found in 81% to 93% of children with ADHD, and convey moderate to high risk for learning and language disabilities, lower academic performance and scholastic achievement, internalizing/externalizing problems, organizational skills deficits, as well as peer and parent-child relational problems.

Evidence reveals two distinct working memory systems: the central executive component and the memory component. The central executive component is sometimes referred to as working memory, although the term "working memory" is often incorrectly ascribed to the memory component. Neuropsychological, neuroanatomical, neuroimaging, and factor analytic investigations support the distinct functioning of the working and memory components, as well as each of the subcomponents within both categories. The working component involves mental processing of internally-held information, and is reified across neurocognitive models as the central executive (CE) 305, internal focus of attention, or secondary memory, among other terms. Meta-analytic and neuroimaging data indicate four interrelated CE subcomponents: continuous updating (e.g., active addition and deletion of items from working memory), dual-processing (e.g., diverse processes that involve operating on information while storing the same or other information in working memory and is often measured by complex span tasks), serial reordering (e.g., mental manipulation of temporal or sequential order), and interference control (e.g., preventing competing information from entering working memory and interrupting the current process). These correlated but distinct CE sub-processes rely on overlapping and non-overlapping mid-lateral prefrontal cortical regions. Longitudinal functional magnetic resonance imaging (fMRI) data indicate three to five year delays in cortical maturation of these regions in pediatric ADHD samples.

No memory/storage functions are ascribed to the CE components; instead, these pre-frontally-mediated executive functions serve to process or manipulate the information currently held within short-term memory (STM). These STM components reflect the memory components of working memory, rely on anatomically distinct cortical regions that demonstrate 0-2 year delays in ADHD samples 300, 350, and provide temporary storage and rehearsal of internally-held phonological 320 (e.g., verbal 310), visual 325, and spatial information 315.

Distinguishing between working (CE) and memory (STM) deficits is critical for understanding the difference between CET and existing, ineffective 'working memory' training protocols. ADHD children demonstrate large magnitude impairments in CE processes, and these impairments are related functionally to inattentive, hyperactive, and impulsive behavior, predict ADHD-related academic underachievement and social problems, and underlie ADHD-related performance deficiencies on behavioral inhibition tasks. For example, it was determined that experimentally manipulating central executive demands had a large magnitude impact on objectively-observed attentive behavior and hyperactivity for children with and without ADHD. Statistically controlling for ADHD-related central executive deficits eliminated between-group differences in critical symptoms of attention, hyperactivity, impulsive responding, response variability, and behavioral inhibition. In contrast, these studies were consistent with previous research indicating that STM deficits are minimally involved in ADHD symptoms.

Developmental studies also reveal that the central executive is critical for academic functioning. Not only does it predict overall math and reading performance, but it also underlies learning skills such as listening comprehension, organizational skills, note taking, and the ability to follow directions. In contrast, these studies indicate that short-term memory (STM) components demonstrate weaker relations with reading and math achievement, and are generally unrelated to comprehension, complex learning, regulation of activity level, and planning abilities. Collectively, all components of working memory are involved in academic outcomes, and children with ADHD display deficits in each of these areas. ADHD related CE deficits, however, are a particularly appealing intervention target given (a) large magnitude deficits, and (b) the strong association between CE deficits and ADHD core impairments.

Now referring to FIGS. 4A, 4B, 5A, 5B, 6A, and 6B, diagrams of comparative data analysis for the central executive training and a different ADHD protocol are depicted. Specifically, the ADHD protocol is the behavioral parent training (BPT), which is currently considered the gold-standard non-medication treatment for ADHD. Development and beta testing of Central Executive Training (CET) were conducted. During CET platform's conceptualization and software development phases, an open-label behavioral parent training trial (Barkley's Defiant Child protocol) was run. BPT was delivered with fidelity in small group format by behaviorally trained, PhD-level clinicians, and showed expected ADHD symptom reduction relative to meta-analytic estimates. When CET platform was ready for beta testing with patients, the behavioral treatment study was completed and those patients were recruited to the CET platform. Only one treatment was offered at a time; both samples comprise consecutive referrals. Duration was 9 sessions (BPT) and 10-12 sessions (CET). CET duration was increased to its final, 12-session format based on parent focus group feedback. All children met rigorous ADHD and inclusion criteria as defined in the protocol. All testing was conducted after >24-hour medication washout. Error bars reflect Bayesian 90% credibility intervals.

CET platform was feasible and acceptable to caregivers 102C and patients 102B. Enrollment and retention were high using the inclusion/exclusion criteria. Of 27 children assessed: 2 were ineligible (not ADHD), 4 declined (2 distance, 2 perceived need), 20 completed 10 or more sessions, and 1 discontinued after two sessions; 100% of consented families completed the post-treatment evaluation.

Caregivers 102C rated CET protocol as highly acceptable. Caregiver-reported BTPS scores were excellent (% of possible barriers endorsed): Total Barriers (M=8.0%, SD=4.8), Relationship with the Therapist (M=2.2%, SD=5.8), Perceived Relevance (M=13.2%, SD=7.9), Treatment Issues/Logistics (M=3.6%, SD=3.4), Competing Activities/Life Stressors (M=10.0%, SD=7.3). Children rated the software as easy to use on the System Usability Scale (M=7.7, SD=2.0 on scale from 1=low to 10=high usability). Children rated the CET training tasks as acceptable on the same form (M=7.6, SD=2.1). Training duration was 7.1 hours with high variation (SD=5.3 hours). CET modifications based on parent focus group feedback appear to be improving engagement (before modifications, M=5.7 hours, 41.1 tasks complete; after modifications, M=13.3 hours, 118.6 tasks complete).

Effects on untrained working memory tests (primary outcomes). CET portended large improvements on the Rapport visuospatial (FIG. 4A) and phonological (FIG. 4B) working memory tests.

CET portended significant improvements in ADHD symptoms, measured both subjectively (parent report) and objectively (actigraphs). Effects were large for parent BASC-2 Attention Problems (FIG. 5A) and Hyperactivity (FIG. 5B) subscales. Effects were medium for actigraph measured hyperactivity symptoms during both working memory tests.

Comparison with behavioral treatment. CET and BPT groups did not differ at pretreatment on age, gender, IQ, percentage taking ADHD medication, socioeconomic status (SES), BASC-2 Attention Problems and Hyperactivity, actigraph-measured hyperactivity, or working memory performance. Post-treatment evaluation completion rates were descriptively higher for CET. In the nonrandomized, sequential pilot comparison, significant time and treatment×time interactions indicated that CET was superior to BPT for improving phonological working memory (FIG. 6B), visuospatial working memory (FIG. 6A), and actigraph-measured hyperactivity during working memory tests. CET was equivalent to BPT and both groups improved on BASC-2 Attention Problems and Hyperactivity.

FIG. 7 is an illustrative diagram of a CET platform 700 used with a CET protocol in accordance with one or more embodiments of the disclosure. The CET platform protocol is a translational, evidence-informed, hybrid (e.g., in-office and at-home) treatment protocol developed based on advances in cognitive and clinical psychology. In some embodiments, the CET platform 700 includes nine CET platform trainings (also referred to as tasks). The use of nine CET platform tasks form a clinical protocol that emphasizes CE training and not just short-term memory training based on (a) best practice recommendations for training CE abilities, (b) recent meta-analyses of working memory neuroimaging studies demonstrating overlapping and non-overlapping cortical regions associated with each modality/CE function, and (c) evidence of ADHD-related cortical underdevelopment in each implicated region.

As depicted in FIG. 7, each of the tasks targets a unique combination of a stimulus modality (e.g., verbal and phonological 702, visual 704, and spatial 706) and a CE process (e.g., continuous memory updating 708, dual-processing 710, and temporal and serial reordering 712). For example, one task targets the unique combination of the spatial 706 stimuli modality with the continuous updating 708 CE process (i.e., the "First Encounter" task depicted in FIG. 7). The training tasks tailored to a unique combination of a stimulus modality and a CE process are innovative and reflect adaptations of psychometrically sound tasks with gaming elements added to improve player engagement, an automated token economy to reinforce training goals, and additional modifications based on consultant and child/caregiver feedback. Given the limited role of STM deficits in ADHD symptoms/impairments, including all three stimuli modalities is intended to ensure maximal opportunity for CE training. This should aid in generalization of CE-related improvements as well. The variety of training tasks 700 and built-in token economy (linked to tangible, in-office rewards) have shown success for promoting continued child engagement.

While the CET platform 700 is depicted as having nine specific tasks ("Word Wheel," "The Hideout," etc.), it is understood that any collection of tasks can be used, so long as each task targets a unique combination of a stimulus modality and a CE process, and all nine unique combinations are covered. The specific tasks described herein are merely illustrative, and are replied upon for ease of discussion. The targeting of a specific stimuli modality can be accomplished by creating a task which requires a user to interact with the CET platform 700 using the specific stimuli modality. For example, the verbal and phonological 702 stimuli modality can be targeted by using sound-based tasks (e.g., the gaming elements with which the user interacts comprise sounds, spoken words or phrases, tones, etc.), the visual 704 stimuli modality can be targeted by using color or shape-based tasks (e.g., the gaming elements with which the user interacts require organizing, sorting, manipulating, or otherwise interacting with colors and shapes), and the spatial 706 stimuli modality can be targeted by using sequencing or positioning-based tasks (e.g., the gaming elements with which the user interacts must be organized, manipulated, or otherwise sorted into specific or relative sequences and positions). Similarly, the targeting of a specific CE process can be accomplished by creating a task which requires a user to interact with the CET platform 700 using the specific CE process. For example, the continuous updating 708 CE process can be targeted by using tasks which require the active addition and deletion of items from working memory (e.g., a task which requires a user to keep track of a continuously updated list of toys). The dual-processing 710 CE process can be targeted by, for example, tasks which involve operating on information while storing the same or other information in working memory, such as known complex span tasks. The serial reordering 712 CE process can be targeted by, for example, tasks which involve the mental manipulation of temporal or sequential order (e.g., a task which requires a user to organize the proper sequencing of a recipe).

As required to improve central executive (CE) abilities, the nine CET platform training tasks collectively provide targeted training aimed at improving each aspect of CE functioning. No additional executive functions other than CE will be targeted at the same time. This is because of meta-analytic evidence that extant ADHD cognitive training protocols are less effective when potency is decreased by targeting multiple executive functions. The nine CET platform training tasks were developed through collaboration among the ADHD, cognitive training, working memory, serious games, and RCT experts according to empirical data.

In some embodiments, targeting the interference control component of CE may involve tasks that train inhibitory control, which is another executive function. It is possible that the CE interference version will improve inhibitory control (and potentially ADHD symptoms). In some embodiments, the CE interference version may be used as an alternative training to the CET platform training.

Figure 8A:
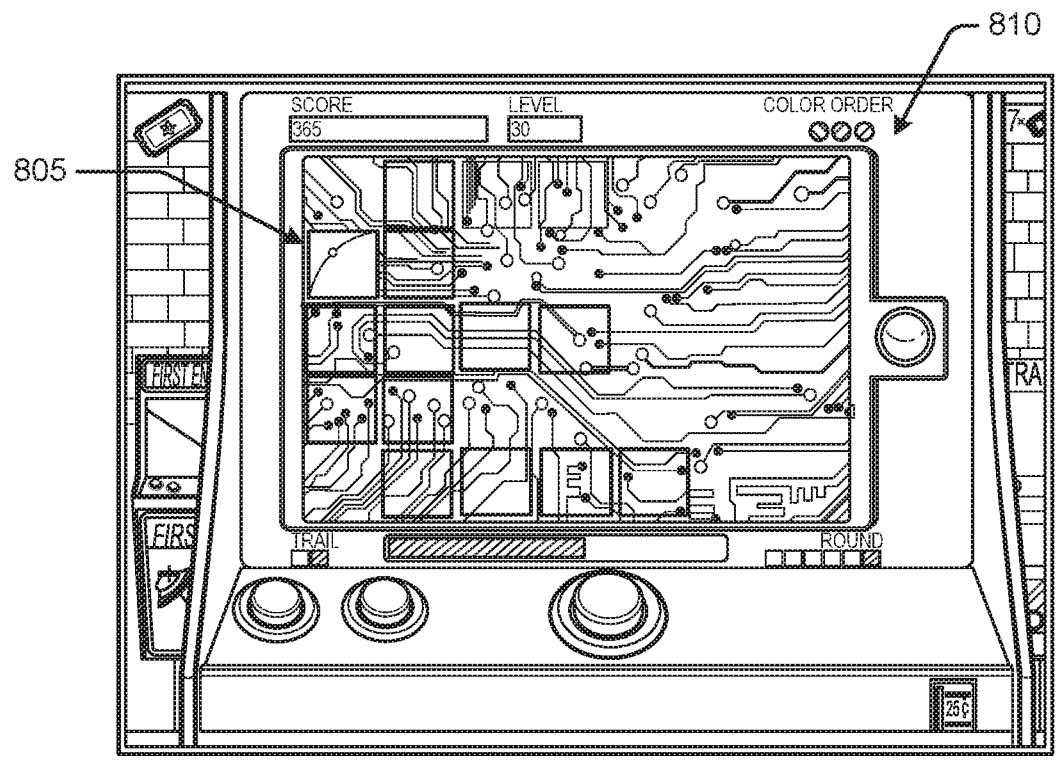
FIGS. 8A, 8B, 9A, and 9B are illustrative screenshots of CET platform trainings in accordance with one or more embodiments of the disclosure.
Figure 8B:
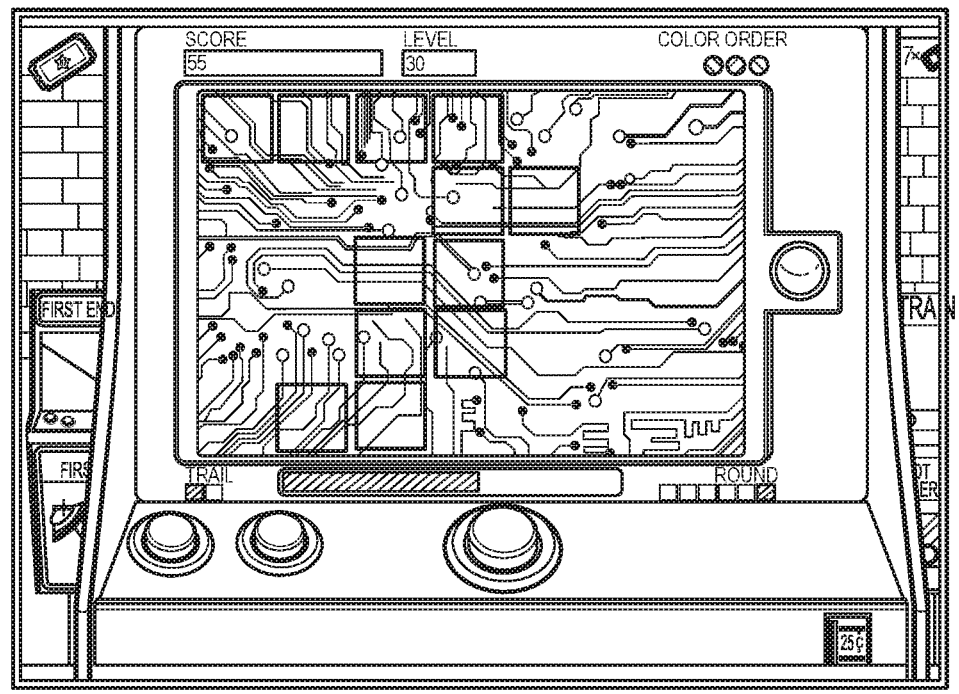

Explicit design features maximize targeting by disallowing task-specific strategies. For example, the screenshots depicted in FIG. 8A and FIG. 8B show two consecutive trials of "Master Thief", which feature different spatial layouts (e.g., boxes 805) and target stimuli colors (e.g., color order indicator 810). Changing spatial layout and stimuli features (e.g., color) every trial is intended to minimize verbal and spatial strategies associated with predictability and repetition. Verbal training tasks use letter combinations that maximally tap CE processes via well-documented phonological similarity effects. Similarly, masking screens and strategically placed "click to continue" buttons require visual saccades that disrupt spatial rehearsal, and prevent strategies such as 'hovering' the mouse over a correct location. Timers are included as gaming elements and to match the format of the CE interference versions (CE interference requires timers to maximize prepotency by rewarding fast responding on non-inhibition 'go' trials). In CET, however, the timers do not affect leveling (i.e., timers disappear but do not invalidate correct responses in CET, whereas late responses in CE interference are omission errors).

The CET platform adapts difficulty for each of the tasks independently based on the within-session and between-session performance of the patient 102B. Fluidly adapting task difficulty is considered a critical component of cognitive training. In other words, CET is a competence-oriented training in which the patient's basal level is established and they are trained up from there, thus ensuring that each patient 102B is constantly working within her/his zone of proximal development ("flow state" in the serious games literature). To ensure breadth of training, the software's "Mission Mode" automatically selects tasks that the patient 102B has not completed recently.

Each patient's basal and ceiling levels are tracked across sessions as evidence of training effects. Adaptive components are dependent on training target, and include aspects such as target density, categories:stimuli ratio, target:non-target stimuli ratio, search space size, and visual discriminability. Adapting the secondary tasks that require the same modality as the to-be-recalled target stimuli yields interference effects that increase demands on controlled attention and the central executive, because both primary and secondary tasks rely on the same limited-capacity store. That is, central executive demands increase because to-be-recalled stimuli are displaced from primary memory by the secondary processing tasks.

All tasks require recall instead of recognition based on compelling evidence that recognition-based tasks share minimal variance with criterion working memory recall tasks.

Memory set also adapts, but as a secondary leveling variable. Memory set refers to the number of stimuli per trial (also called 'cognitive load'). It is included as a leveling variable, but de-emphasized in CET based on evidence that CE demands remain relatively constant despite changing memory set for tasks with prominent central executive demands. Evidence supporting this design comes from both non-ADHD and ADHD samples. This is a critical distinction between CET and extant simple span 'working memory' training protocols that adapt difficulty by increasing the memory set. Leveling was set to ensure incremental increases in difficulty.

Figure 9A:
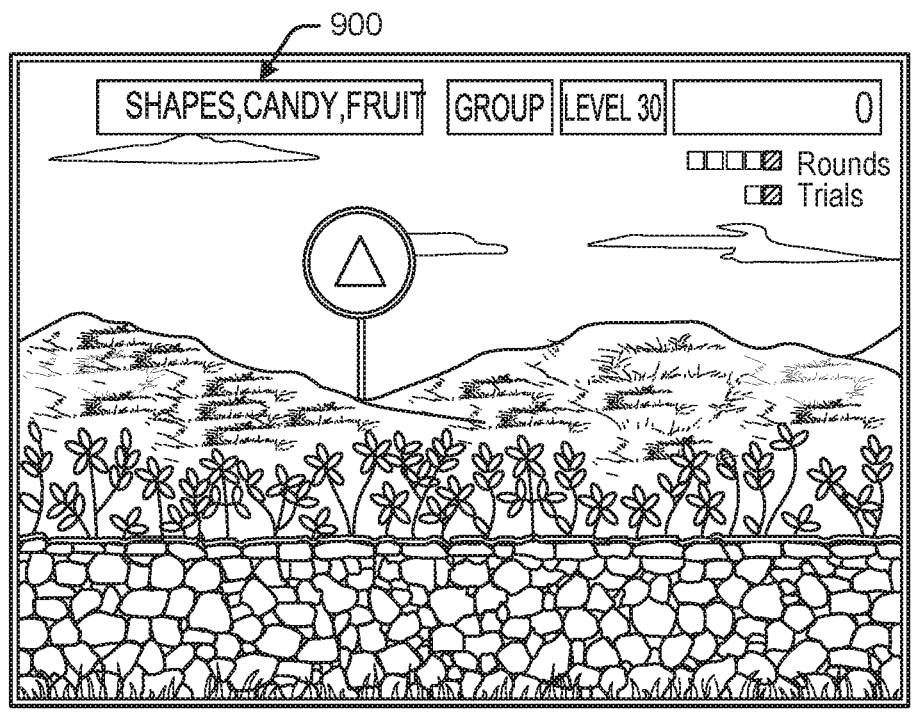
Figure 9B:
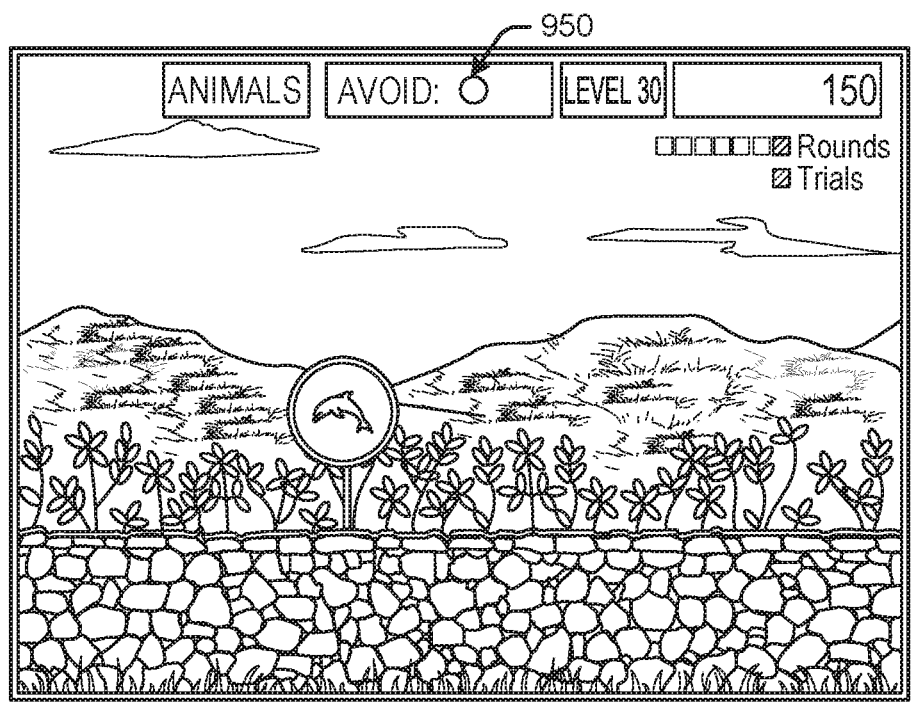

CE interference tasks are identical in name, look, feel, playability, and duration to CET platform training tasks, with the exception of the training target to control for internal validity threats. As an example, FIG. 9A depicts a screenshot of the CET platform training task and FIG. 9B depicts a screenshot of the CE interference training task (e.g., different versions of "Shape Shooter"). In the CET platform version (e.g., visual updating) depicted in FIG. 9A, patients 102B keep track of the last exemplar from each of the 3 categories listed in the box 900. In the CE interference version (e.g., visual inhibition) depicted in FIG. 9B, the children may respond to all colored shapes except the color shown in the "Avoid" box 950.

A critical flaw of comparator conditions in many cognitive training studies is poor credibility—for example, tasks that do not dynamically adapt based on patient 102B performance are readily identified by participants as 'placebos' that create spurious support for treatment efficacy by lowering control group expectancies. Tasks that train non-credible abilities may similarly produce spurious treatment effects due to reduced expectancies among control participants and/or unblinded study staff. To address this critical issue and to prevent differential expectancies at the administrator 102A, patient 102B, and caregiver 102C levels by developing training tasks that are credible in terms of dynamically adapting difficulty on cognitive function(s) with face validity for improving ADHD symptoms. For example, training tasks were developed and directed to train inhibition, a credible training target that is designed to improve interference control rather than the other three CE processes (i.e., continuous updating, dual-processing, serial/temporal reordering) and thus show differential changes in specific processes as a result of treatment.

CE interference's credibility as a training target stems from its status as an executive function and conceptual models that emphasize inhibition as a core, causal process in ADHD (including models that view central executive deficits as secondary to inhibition deficits). In addition, inhibition shows strong face validity as a training target due to its conceptual overlap with impulsivity, a core ADHD symptom.

CE interference tasks adapt on go:stop target ratio, presentation rate, response speed (timers), and number of stimuli. Increasing the target density increases inhibition demands (i.e., increasing 'go' trials increases prepotency, which makes it more difficult to inhibit during infrequently-occurring 'stop' trials). CE interference provides a better control mechanism to comparing the CET platform results to current, evidence-based behavioral treatments.

The CET and CE interference conditions are identical with the exception of training target, which allows strong conclusions regarding the mechanisms responsible for emerging group differences. Thus, CE interference provides the most robust control for internal validity threats. In some embodiments, CET and CE interference training tasks may be combined into a hybrid training protocol based on pretesting that identifies the patient's unique neurocognitive impairment profile.

A hybrid training protocol combining CET (i.e., continuous updating, dual-processing, serial/temporal reordering) and CE interference training tasks in this manner leverages the high level of heterogeneity in ADHD. That is, there are different neurocognitive profiles that can result in very similar sets of behavioral symptoms. Approximately 65% of individuals with ADHD have ADHD due to continuous updating, dual-processing, and serial/temporal reordering deficits, and another 30% have ADHD due to inhibition or interference deficits. Consequently, a hybrid CET and CE interference training tool is applicable to roughly ~90% of individuals with ADHD who have neurocognitive profiles consistent with our training targets.

The CET platform protocol for treating ADHD symptoms, which may be a hybrid protocol, includes weekly, in-office sessions with the patient 102B (e.g., 1 hour) and a concurrent caregiver psychoeducational group, combined with caregiver supervised, in-home training (e.g., 15-min/day, 2-3 days/week). This format was considered feasible based on caregiver focus groups and recent ADHD cognitive training meta-analysis indicating that effect sizes increased and participant retention remained high across studies with similar treatment durations.

The patient in-office sessions may include 50 minutes of training tasks, completed individually with their therapist, and 10 minutes with all children together. During individual training with the study therapist, patients 102B may complete a series of computer tasks (e.g., CET platform or CE interference platform) designed to improve specific cognitive abilities through repeated practice. CET platform and CE interference tasks are identical except for the training target (e.g., central executive updating/dual-processing/reordering vs. interference control/inhibition). Each task includes components to increase motivation and engagement (e.g., appealing animations, background stories/context, built-in token economy). Patients 102B may earn virtual "tickets" during in-session and at-home training, which are traded for tangible prizes during in-office sessions. This token economy is administered automatically by the CET/CE interference system using the same predefined, behavioral goals for all children (e.g., correct responses, task completion). During the last 10 minutes, children trade in their earned tokens ("tickets") for tangible rewards (e.g., bouncy balls, foosball games with peers). These behavioral components are integrated into the software and identical across CET/CE interference to allow emerging effects to be attributable to the CET protocol (e.g., CE vs. interference/inhibition training).

The patient 102B may retain the same study therapist each week; study therapists may be trained paraprofessionals (e.g., undergraduate assistants, interns). For the purposes of studying the protocol's effectiveness, these paraprofessionals are not present during their children's mid/post/follow-up testing. Study therapist assignment will be tracked and probed.

The caregiver psychoeducational group occurs in a separate room from the patient in-office training session, led by PhD-level study therapists. The caregiver component was added based on caregiver focus group feedback. No active treatment components are included in the caregiver group. Caregiver groups are intended to promote treatment adherence and troubleshoot difficulties with the at-home training (e.g., demonstrating login procedures, brainstorming feasible days/times for the child to complete training). A further goal of the caregiver group was to establish the infrastructure anticipated for future trials that combine CET with extant evidence-based psychosocial treatments, because most of these programs involve working with the caregiver rather than child (e.g., caregiver training). Without wishing to be bound by theory, it is expected that CE training as described herein may actually improve the effectiveness of these other evidence-based psychosocial treatments. Topics include ADHD, common comorbidities, current ADHD evidence-based treatments, IEP/504 Plans, and future-oriented topics such as college and motor vehicle driving risk.

Importantly, caregiver groups are mixed (CET and CE interference). Mixed caregiver groups may minimize any differential effects of study therapist on caregiver expectancies. To maintain relative control of the in-home daily training session, caregivers are told to treat at-home sessions just like any in-office appointment (e.g., phones to voicemail, pets to other rooms).

Figure 10:
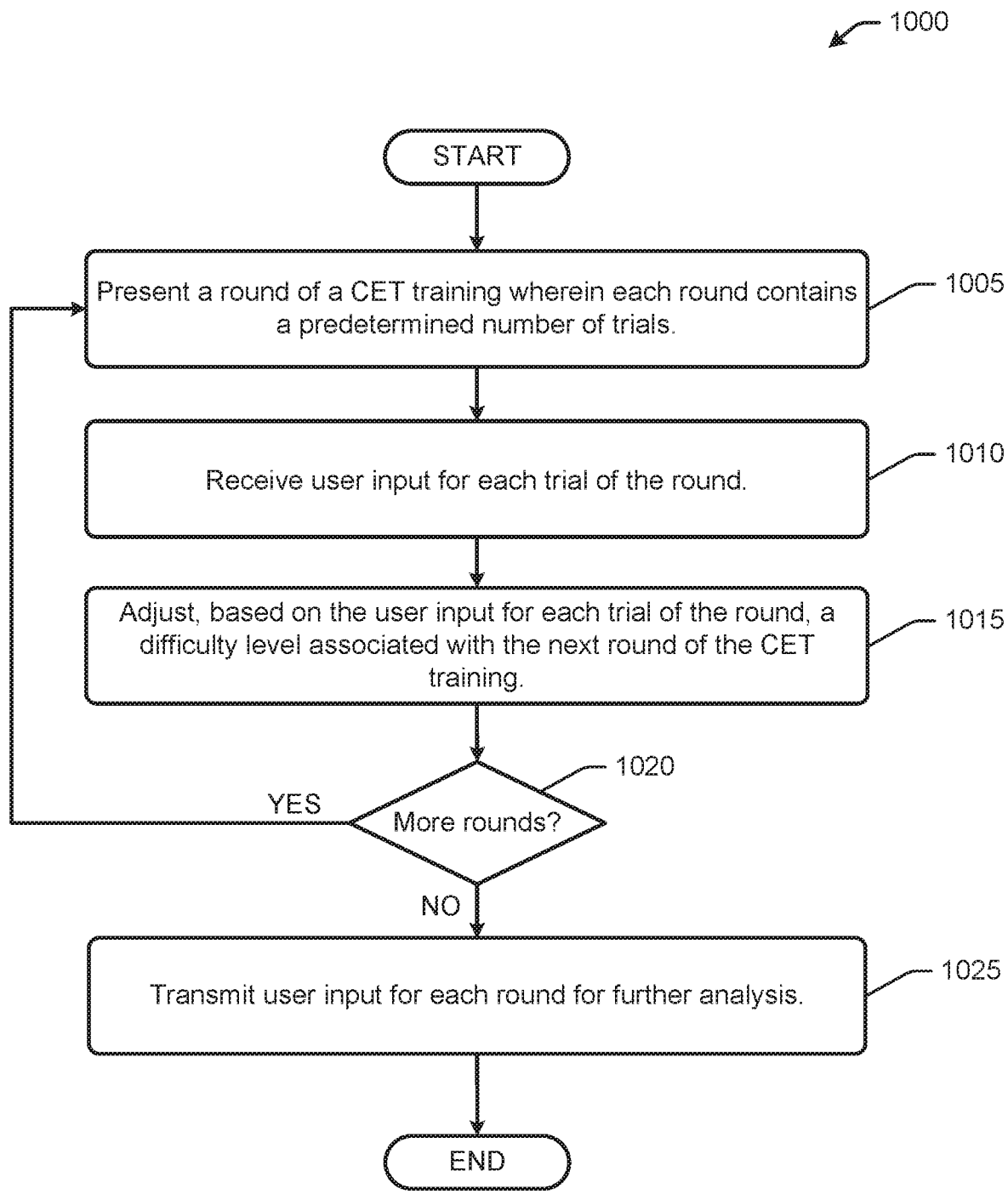
FIG. 10 is a flow diagram of an illustrative method for a CET platform in accordance with one or more embodiments of the disclosure.

Now referring to FIG. 10, a flow diagram of an illustrative method 1000 for a CET platform in accordance with one or more embodiments of the disclosure is depicted. At block 1005, a CET platform server 106 may facilitate presentation of a round of a CET platform training, wherein each round contains a customizable or predetermined number of trials. At block 1010, the CET platform server 106 may receive user input from a user device 104B of a patient 102B. At block 1015, the CET platform server 106 can adjust, based on the user input for each trial of the round, a difficulty level associated with the next round of the CET training. At block 1020, a determination may be made by the CET platform server 106 to determine whether there are additional rounds in the CET training. If yes, the method 1000 may proceed back to block 1005. If no, then the method 1000 may proceed to block 1025, where the CET training may transmit the user input for each round for further analysis. This workflow can be repeated for any number of CET platform trainings. In one embodiment, this workflow repeats until all CET platform trainings have been completed at least one time (e.g., until all nine training tasks 700 have been completed).

CONCLUSION

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, can be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that can direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A non-transitory computer-readable medium storing computer-executable instructions which, when executed by a processor, cause the processor to perform operations comprising:
   generating a central executive training (CET) task,
   wherein the CET task includes presentation of a combination of a stimuli modality and a CE process, wherein the stimuli modality is one of a verbal or phonological stimuli modality, a visual stimuli modality, or a spatial stimuli modality, and
   wherein the CE process is one of a continuous memory updating CE process, a dual-processing CE process, a temporal or serial reordering CE process, or an interference control CE process, wherein the dual-processing CE process involves a complex span task, wherein the continuous memory updating CE process involves a task which requires a user to keep track of a continuously updated list, wherein the temporal or serial reordering CE process involves a task which requires a user to organize a proper sequencing of information, and wherein the interference control CE process involves a task which requires a user to provide an input in response to one or more stimuli other than an indicated stimuli;

generating a presentation of a game including a first round of the CET task on a user interface of a user device, wherein the first round comprises a customizable number of trials, each trial requesting a specific user input;

receiving, based at least in part on the first round of the CET task, a user input made to the game presented on the user interface of the device;

comparing the user input to the specific user input;

automatically adapting, based on the comparison of the user input from the user device to the specific user input, a search space size, visual discriminability, or density associated with a second round of the CET task;

generating a presentation of a game including the second round of the CET task and the stimuli on the user interface of the user device;

receiving, based at least in part on the second round of the CET task, a second input made to the game presented on the user interface of the device;

comparing the second input to the specific user input; and determining, based at least in part on the comparison of the user input and the second input to the specific user input, a change in central executive (CE) data associated with the user.

2. The non-transitory computer-readable medium of claim 1, wherein determining, based at least in part on the comparison of the user input and the second input to the specific user input, the change in the CE data associated with the user further comprises:

receiving user input from a caregiver associated with the user; and determining, based at least in part on the user input, the second input, and the user input from the caregiver, the change in the CE data associated with the user.

3. The non-transitory computer-readable medium of claim 1, wherein generating the presentation of the first round of the CET task on the user device for the user further comprises:

generating the presentation of the first round of the CET task on the user device at pre-determined time intervals based on information associated with the user.

4. The non-transitory computer-readable medium of claim 1, wherein the operations further comprise generating a report based on historic CE data associated with the user.

5. The non-transitory computer-readable medium of claim 1, wherein the CET task is a first CET task, wherein the first CET task involves a first stimuli modality and wherein the processor performs operations further comprising:

generating a presentation of a first round of a second CET task on the user device for the user, wherein the first round comprises a customizable number of trials, and wherein the second CET task targets a different unique combination of a stimuli modality and a CE process than the first CET task.

6. A central executive training (CET) platform comprising:

one or more training modules, each training module comprising a unique CET task targeting a unique combination of a stimuli modality and a central executive (CE) process, wherein the stimuli modality is one of a verbal or phonological stimuli modality, a visual stimuli modality, or a spatial stimuli modality, and wherein the CE process is one of a continuous memory updating CE process, a dual-processing CE process, a temporal or serial reordering CE process, or an interference control CE process, wherein the dual-processing CE process involves a complex span task, wherein the continuous memory updating CE process involves a task which requires a user to keep track of a continuously updated list, wherein the temporal or serial reordering CE process involves a task which requires a user to organize a proper sequencing of information, and wherein the interference control CE process involves a task which requires a user to provide an input in response to one or more stimuli other than an indicated stimuli; and at least one processor, wherein the at least one processor is configured to:

generate a presentation of a game including a first round of a central executive training (CET) task on a user interface of a user device, wherein the first round comprises a customizable number of trials, each trial requesting a specific user input;

receive, based at least in part on the first round of the CET task, a user input made to the game presented on the user interface of the device;

compare the user input to the specific user input;

automatically adapt, based on the comparison of the user input from the user device to the specific user input, a search space size, visual discriminability, or density associated with a second round of the CET task;

generate a presentation of a game including the second round of the CET task and the stimuli on the user interface of the user device;

receive, based at least in part on the second round of the CET task, a second input made to the game presented on the user interface of the device;

compare the second input to the specific user input; and determine, based at least in part on the comparison of the user input and the second input to the specific user input, a change in central executive (CE) data associated with the user; and continue to present additional combinations of a stimuli modality and a CE process until all combinations of a stimuli modality and a CE process have been presented.

7. The CET platform of claim 6, wherein determining by the at least one processor, based at least in part on the comparison of the user input and the second input to the specific user input, the change in the CE data associated with the user further comprises:

receiving user input from a caregiver associated with the user; and determining, based at least in part on the user input, the second input, and the user input from the caregiver, the change in the CE data associated with the user.

8. The CET platform of claim 6, wherein generating by the at least one processor a presentation of the first round of the CET task on the user device for the user further comprises:

generating the presentation of the first round of the CET task on the user device at pre-determined time intervals based on information associated with the user.

9. The CET platform of claim 6, wherein the at least one processor is further configured to generate a report based on historic CE data associated with the user.

10. The CET platform of claim 6, wherein the CET task is a first CET task, and wherein the at least one processor is further configured to generate a presentation of a first round of a second CET task on the user device for the user, wherein the first round comprises a customizable number of trials, and wherein the second CET task targets a different unique combination of a stimuli modality and a CE process than the first CET task.

11. A method comprising
generating a central executive training (CET) task,
wherein the CET task includes presentation of a combination of a stimuli modality and a CE process, wherein the stimuli modality is one of a verbal or phonological stimuli modality, a visual stimuli modality, or a spatial stimuli modality, and wherein the CE process is one of a continuous memory updating CE process, a dual-processing CE process, a temporal or serial reordering CE process, or an interference control CE process,
wherein the CE process is one of a continuous memory updating CE process, a dual-processing CE process, a temporal or serial reordering CE process, or an interference control CE process, wherein the dual-processing CE process involves a complex span task, wherein the continuous memory updating CE process involves a task which requires a user to keep track of a continuously updated list, wherein the temporal or serial reordering CE process involves a task which requires a user to organize a proper sequencing of information, and wherein the interference control CE process involves a task which requires a user to provide an input to one or more stimuli other than an indicated stimuli;
generating a presentation of a game including a first round of the CET task on a user interface of a user device, wherein the first round comprises a customizable number of trials, each trial requesting a specific user input;
receiving, based at least in part on the first round of the CET task, a user input made to the game presented on the user interface of the device;
comparing the user input to the specific user input;
automatically adapting, based on the comparison of the user input from the user device to the specific user input, a search space size, visual discriminability, or density associated with a second round of the CET task;
generating a presentation of a game including the second round of the CET task and the stimuli on the user interface of the user device;
receiving, based at least in part on the second round of the CET task, a second input made to the game presented on the user interface of the device;
comparing the second input to the specific user input; and
determining, based at least in part on the comparison of the user input and the second input to the specific user input, a change in central executive (CE) data associated with the user; and
continuing to present additional combinations of a stimuli modality and a CE process until all combinations of a stimuli modality and a CE process have been presented.

12. The method of claim 11, wherein the CET task is a first CET task, and wherein the method further comprises generating a presentation of a first round of a second CET task on the user device for the user, wherein the first round comprises a customizable number of trials, and wherein the second CET task targets a different unique combination of a stimuli modality and a CE process than the first CET task.

13. The non-transitory computer-readable medium of claim 1, wherein the CET task further comprises:
displaying, a first selectable element in the game in a first location in the user interface at a first time;
receiving a user selection of the first selectable element in the user interface; and
displaying, a first selectable element in the game in a second location in the user interface at a second time, the second location being different than the first location.

14. The non-transitory computer-readable medium of claim 1, wherein the game is a first game, and wherein the processor performs operations further comprising:
3. generating, based on the comparison between the second input from the user device and the specific user input, a presentation of a second game including a second round of a central executive training (CET) task on the user interface of the user device, wherein the second round comprises a second customizable number of trials that are different than the customizable number of trials, wherein a first trial of the second customizable number of trials requests a second specific user input that is different than the specific user input.

15. The non-transitory computer-readable medium of claim 1, wherein the processor performs operations further comprising:
automatically adapting, based on the comparison of the user input from the user device to the specific user input, size, speed, color, length, or phonological sequence of a stimuli associated with a second round of the CET task.

16. The CET platform of claim 6, the at least one processor is further configured to:
automatically adapt, based on the comparison of the user input from the user device to the specific user input, size, speed, color, length, or phonological sequence of a stimuli associated with a second round of the CET task.

17. The method of claim 11, further comprising
automatically adapting, based on the comparison of the user input from the user device to the specific user input, size, speed, color, length, or phonological sequence of a stimuli associated with a second round of the CET task.

* * * * *